UNITED STATES PATENT OFFICE.

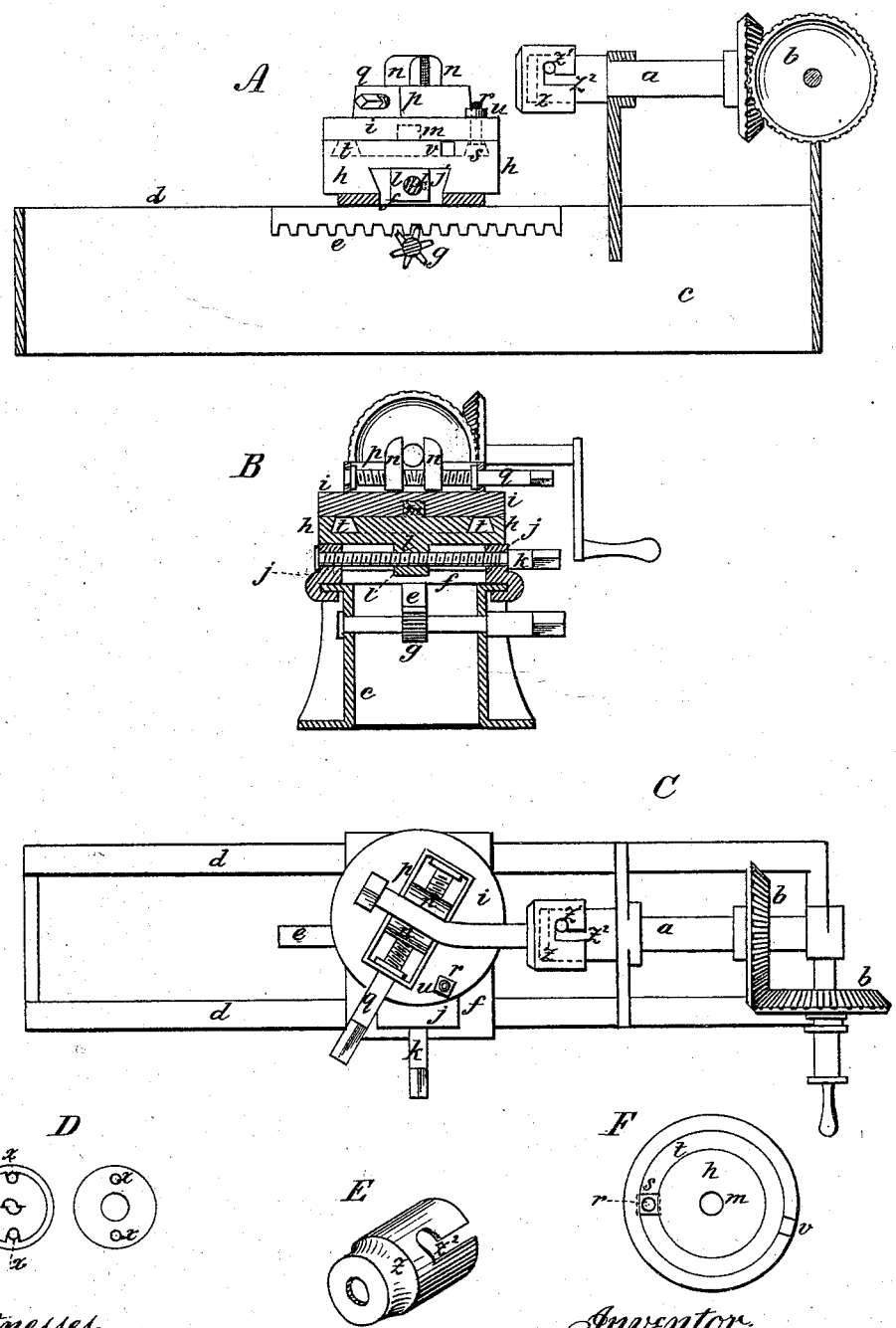

MAURICE B. FLYNN, OF BROOKLYN, NEW YORK.

IMPROVEMENT IN SCREW-CUTTING MACHINES.

Specification forming part of Letters Patent No. 143,685, dated October 14, 1873; application filed September 17, 1873.

*To all whom it may concern:*

Be it known that I, MAURICE B. FLYNN, of the city of Brooklyn, in the county of Kings and State of New York, have invented certain new and useful Improvements in Machines for Cutting Screw-Threads on Bolts, Gas-Pipes, and Crooked Work, of which the following is a specification:

My invention relates to thread-cutting and tapping machines, the special design of said invention being to adapt the machine for cutting screws upon cylindrical work of irregular or regular shape in length, or upon parts attached to such work, and this I accomplish by means of a work-holder, having the combination therein of adjustable jaws, a pivoted jaw-holding center plate, and a transverse adjustable bed-plate, operating in connection with the threading-die, whereby the holding-jaws can be adjusted obliquely and transversely with respect to the axis-line of the die-mandrel, and thus enable the operator to clamp the work at crooks or bends, and to advance the work to cut the threads no matter how irregular in shape the thing may be to which the part to be threaded may be attached or form a part. A further improvement consists in securing the die or dies to the mandrel between interlocking end pins, and within a removable cap telescoping with the mandrel and interlocking with pins on its circumference, whereby the steel die is held securely to its seat, and may be quickly removed and replaced by dies for cutting larger or smaller diameter of threads without having to undo and make fixed fastenings therewith.

In the accompanying drawings, A represents a side view of a machine having my improvements applied thereto; B, a cross-section; C, a top view; D, an enlarged end view of the mandrel and die in place, and with them separated; E, the die-holding cap; and F, a top view of the centering jaw-plate carrier. The mandrel $a$, and the gearing $b$ for driving it, are mounted in a bed-frame, $c$, and the work-holding device is arranged upon ways $d$ in front of the die-holding mandrel, and moved toward and from it in cutting the thread and removing the threaded article by means of a rack, $e$, on a slide, $f$, operated by a pinion, $g$, mounted in bearings in the bed-frame.

Upon the slide $f$ is arranged a carrier, $h$, for a pivoted jaw-plate, $i$, and this carrier is fitted upon dovetail cheeks $j$ on the slide $f$, upon which it has a transverse adjustment by means of a screw, $k$, secured in the slide-cheeks $j$ by end collars, and passing through a center tongue-projection, $l$, from the carrier $h$, so that the turning of the screw $k$ to the right or left will move the carrier by its projection $l$, and with it the work-holder, to give any required right-angled adjustment of the work to the axis-line of the die-mandrel. A center-pivot, $m$, rises from the carrier $h$, upon which the jaw-holding plate $i$ is centered, so as to be turned thereon, and the jaws $n$ being arranged to project from a socket-piece, $p$, on the plate $i$, the swiveling of the latter will, therefore, change the position and angle of the jaws to the axis line of the mandrel, so that whether the work be straight or crooked it will be grasped by the jaws $n$, and held in proper position to the threading-die. To perfect this adjustment the jaws themselves must be adjustable, and for this purpose they are secured in the socket-piece $p$ upon a right and left screw-threaded stem, $q$, fitted in the ends of the socket-piece. The jaw-holding plate $i$ is secured upon its carrier $h$, so that it may be swiveled thereon, and be clamped when set by means of a screw-shank, $r$, passing through said plate, and having its head $s$ beveled and fitted into an annular groove, $t$, in the top of the carrier $h$, in the manner of a dovetail, but sufficiently free to allow it to be moved round as the centered plate is turned, and, when so adjusted, held firmly by clamping a nut, $u$, on the screw $r$, down upon the jaw-plate. The beveled head $s$ of the screw $r$ is entered within its holding-groove $t$ by a side notch, $v$, as shown at F. The mandrel $a$ is hollow, to accommodate any length of screw to be cut, and the steel die (or dies) $w$ is fitted upon its end, and held by two pins, $x\ x$, by a cap or sleeve, $z$, fitted over and upon the end of the mandrel and against the rim and face of the die, and interlocked with the mandrel by pins $z^1$ on the latter, over which catch notches $z^2$, in the cap, to intermatch or fasten like a bayonet. It may be easily removed, and its removal allows the die to be taken off, and put upon, the pins $x\ x$ for any purpose desired, thus rendering the connection of the parts highly advantageous for use with different-sized dies by fitting their notches $z^2$ upon the pins $x$, and requiring but little time to attach and detach the thread-cutting die.

The adjustment of the several parts of the work-holder and the operation of the die-mandrel are effected by crank-handles on the ends of the screw-stems and the axis of the driving-gear.

I claim—

1. In machines for cutting screw-threads, the combination therewith of a holder for the work, composed of adjustable jaws $n$, a swiveling jaw-carrying center plate, $i$, and a transverse adjustable carrier, $h$, for the jaw-plate, for joint operation with the slide $f$, and having their adjustments effected essentially as and for the purpose described.

2. The die or dies $w$, notched as described, in combination with the holding-pins $x\ x$, the holding-cap $z$, and the mandrel $a$, essentially as described, and to obtain the advantages stated.

MAURICE B. FLYNN.

Witnesses:
EDWARD BARRADOUGH,
JOSEPH DANE.